United States Patent
Watfa et al.

(10) Patent No.: US 12,413,953 B2
(45) Date of Patent: Sep. 9, 2025

(54) IMPROVING DISASTER ROAMING SERVICE

(71) Applicant: Samsung Electronics Co., Ltd., Suwon-si (KR)

(72) Inventors: Mahmoud Watfa, Staines (GB); Lalith Kumar, Marathahalli (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 17/980,197

(22) Filed: Nov. 3, 2022

(65) Prior Publication Data

US 2023/0136118 A1   May 4, 2023

(30) Foreign Application Priority Data

Nov. 3, 2021  (IN) ............................. 202131050575
Nov. 1, 2022  (GB) ...................................... 2216188

(51) Int. Cl.
*H04W 8/06* (2009.01)
*H04W 48/18* (2009.01)
(Continued)

(52) U.S. Cl.
CPC ........... *H04W 8/065* (2013.01); *H04W 48/18* (2013.01); *H04W 72/30* (2023.01); *H04W 76/50* (2018.02)

(58) Field of Classification Search
CPC ..... H04W 8/065; H04W 76/50; H04W 72/30; H04W 48/18
(Continued)

(56) References Cited

U.S. PATENT DOCUMENTS 7,949,326 B2 *   5/2011   Gallagher ............. H04W 16/16
                                                          455/404.1
8,041,335 B2 *  10/2011   Khetawat ............. H04L 63/104
                                                          455/404.1
(Continued)

FOREIGN PATENT DOCUMENTS

GB        2604723 A       9/2022
WO     2020/141964 A1     7/2020
(Continued)

OTHER PUBLICATIONS

3GPP; 3rd Generation Partnership Project; Technical Specification Group Services and System Aspects; Procedures for the 5G System (5GS); Stage 2 (Release 17); 3GPP TS 23.502; V17.2.1; (Sep. 2021); Sep. 29, 2021; Valbonne, France.
(Continued)

*Primary Examiner* — Nghi H Ly
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method performed by an access and mobility management function (AMF) in a public land mobile network (PLMN) providing disaster roaming service is provided. The method includes determining whether a disaster condition has ended in a previous PLMN associated with a user equipment (UE) which is registered for the disaster roaming service, in response to determining that the disaster condition has ended and the UE has an emergency protocol data unit (PDU) session, generating a message indicating that the UE is registered for emergency service, and transmitting, to the UE, the message.

12 Claims, 3 Drawing Sheets

(51) Int. Cl.
*H04W 72/30* (2023.01)
*H04W 76/50* (2018.01)

(58) Field of Classification Search
USPC ....... 455/404.1, 435.1, 414.1, 410, 418, 423
See application file for complete search history.

(56) References Cited

U.S. PATENT DOCUMENTS

| | | |
|---|---|---|
| 2011/0171926 A1 | 7/2011 | Faccin et al. |
| 2022/0070815 A1 | 3/2022 | Chun |
| 2022/0217519 A1 | 7/2022 | Kim et al. |
| 2022/0240213 A1* | 7/2022 | Ly ................... H04W 60/02 |
| 2022/0345879 A1* | 10/2022 | Park ................. H04W 80/10 |

FOREIGN PATENT DOCUMENTS

| | | |
|---|---|---|
| WO | 2020/213817 A1 | 10/2020 |
| WO | 2021/151811 A1 | 8/2021 |
| WO | 2022/014981 A1 | 1/2022 |

OTHER PUBLICATIONS

United Kingdom Office Action dated Apr. 21, 2023; United Kingdom Appln. No. 2216188.9.
3rd Generation Partnership Project; Technical Specification Group Core Network and Terminals; Study on the support for minimization of service interruption; (Release 17); 3GPP TS 24.811; V17.1.0 (Sep. 2021); Valbonne, France.
3rd Generation Partnership Project; Technical Specification Group Core Network and Terminals; Non-Access-Stratum (NAS) functions related to Mobile Station (MS) in idle mode (Release 17); 3GPP TS 23.122; V17.4.0 (Sep. 2021); Valbonne, France.
3rd Generation Partnership Project; Technical Specification Group Services and System Aspects; System architecture for the 5G System (5GS); Stage 2 (Release 17); 3GPP TS 23.501; V17.2.0 (Sep. 2021); Valbonne, France.
3rd Generation Partnership Project; Technical Specification Group Core Network and Terminals; Non-Access-Stratum (NAS) protocol for 5G System (5GS); Stage 3; (Release 17); 3GPP TS 24.501; V17.4.1 (Sep. 2021); Valbonne, France.
Qualcomm Incorporated et al.; Provisioning of parameters for disaster roaming in the UE; 3GPP TSG-CT WG1 Meeting #132-e; C1-216193; Oct. 11-15, 2021; Oct. 14, 2021; E-meeting.
International Search Report with Written Opinion dated Feb. 14, 2023; International Appln. No. PCT/KR2022/017141.
Qualcomm Incorporated; Provisioning of registration time restrictions in the UE for disaster roaming; 3GPP TSG-CT WG1 Meeting #131-e; C1-215022 (was C1-214365); E-meeting Aug. 19-27, 2021, XP052042292, Aug. 26, 2021.
United Kingdom Search Report dated Sep. 19, 2024; United Kingdom Appln. No. GB2216188.9.
Extended European Search Report dated Nov. 18, 2024; European Appln. No. 22890410.8-1215 / 4388760 PCT/KR2022017141.

* cited by examiner

IMPROVING DISASTER ROAMING SERVICE

CROSS-REFERENCE TO RELATED APPLICATION(S)

This application is based on and claims priority under 35 U.S.C. § 119(a) of an Indian Provisional patent application number 202131050575, filed on Nov. 3, 2021, in the Indian Patent Office and of a United Kingdom patent application number 2216188.9, filed on Nov. 1, 2022, in the United Kingdom Intellectual Property Office, the disclosure of each of which is incorporated by reference herein in its entirety.

BACKGROUND

1. Field

The disclosure relates to the field of communication technology improvements. More particularly, the disclosure relates to a method and apparatus for providing a disaster roaming service.

2. Description of Related Art $5^{th}$ generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement $6^{th}$ generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for providing disaster roaming service.

Another aspect of the disclosure is to provide an apparatus including a memory configured to store a computer program, and a processor configured to run the computer program to implement the method described in any one of the above aspects.

Additional aspects will be set forth in part in the description which follows and, in part, will be apparent from the description, or may be learned by practice of the presented embodiments.

In accordance with an aspect of the disclosure, a method of managing disaster roaming is provided. A user equipment (UE) previously registered with a first network, which is subject to a disaster, is subsequently registered with a second network, which provides disaster roaming service. The UE has a protocol data unit (PDU) session for emergency services active at a given time, the second network determines that the disaster roaming service is to end but maintains the PDU session for emergency services.

In an embodiment of the disclosure, an access and mobility management function (AMF) of the second network is responsible for ending the disaster roaming service and maintaining the PDU session for emergency services.

In an embodiment of the disclosure, the AMF performs one or more of the following actions a) considers the UE to be registered for emergency services, b) sends a Configuration Update Command message, including a $5^{th}$ generation (5G) system (5GS) registration result Information Element (IE) and sets the value such that it indicates that the UE is registered for emergency services, c) informs each associated Session Management Function, session management function (SMF), to release any PDU session that is not related to the PDU session for emergency services, and d) create a timer which signifies the time the UE should wait before returning to the first network for which a disaster condition is no longer available.

In an embodiment of the disclosure, the given time is when the disaster condition affecting the first network ends or when the second network determines that it can no longer serve the UE for disaster roaming.

In an embodiment of the disclosure, the second network then ends the disaster roaming service.

In an embodiment of the disclosure, for the UE registered for disaster roaming services, the AMF of the second network receives a Registration Request message where a 5G mobility management (5GMM) capability IE indicates that the UE supports S1 mode, and the AMF sends a Security Mode Command message, including "Selected evolved packet system (EPS) non-access stratum (NAS) algorithms" IE and also sets the respective algorithms to NULL values.

In an embodiment of the disclosure, the AMF sends the Security Mode Command message at any time, either during or after the completion of the registration procedure.

In an embodiment of the disclosure, the respective algorithms concern integrity protection and/or encryption and the NULL values are EIA0 and EEA0.

In accordance with another aspect of the disclosure, a method performed by an AMF in a public land mobile network (PLMN) providing disaster roaming service is provided. The method includes determining whether a disaster condition has ended in a previous PLMN associated with a UE which is registered for the disaster roaming service, in response to determining that the disaster condition has ended and the UE has an emergency PDU session, generating a message indicating that the UE is registered for emergency service, and transmitting, to the UE, the message.

In accordance with another aspect of the disclosure, a method performed by a UE is provided. The method includes determining a disaster condition on a PLMN, in response to the disaster condition, performing a registration procedure for a disaster roaming service, receiving the disaster roaming service from another PLMN providing the disaster roaming service, and in case that the UE has an emergency PDU session, receiving, from an AMF in the PLMN providing the disaster roaming service, a message indicating that the UE is registered for emergency service.

In accordance with another aspect of the disclosure, an AMF is provided. The AMF includes a transceiver and a processor coupled with the transceiver and configured to determine whether a disaster condition has ended in a previous PLMN associated with a UE which is registered for the disaster roaming service, in response to determining that the disaster condition has ended and the UE has an emergency PDU session, generate a message indicating that the UE is registered for emergency service, and transmit, to the UE, the message.

In accordance with another aspect of the disclosure, a UE is provided. The UE includes a transceiver and a processor coupled with the transceiver and configured to determine a disaster condition on a PLMN, in response to the disaster condition, perform a registration procedure for disaster roaming service, receive the disaster roaming service from another PLMN providing the disaster roaming service, and in case that the UE has an emergency PDU session, receive, from an AMF in the PLMN providing the disaster roaming service, a message indicating that the UE is registered for emergency service.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
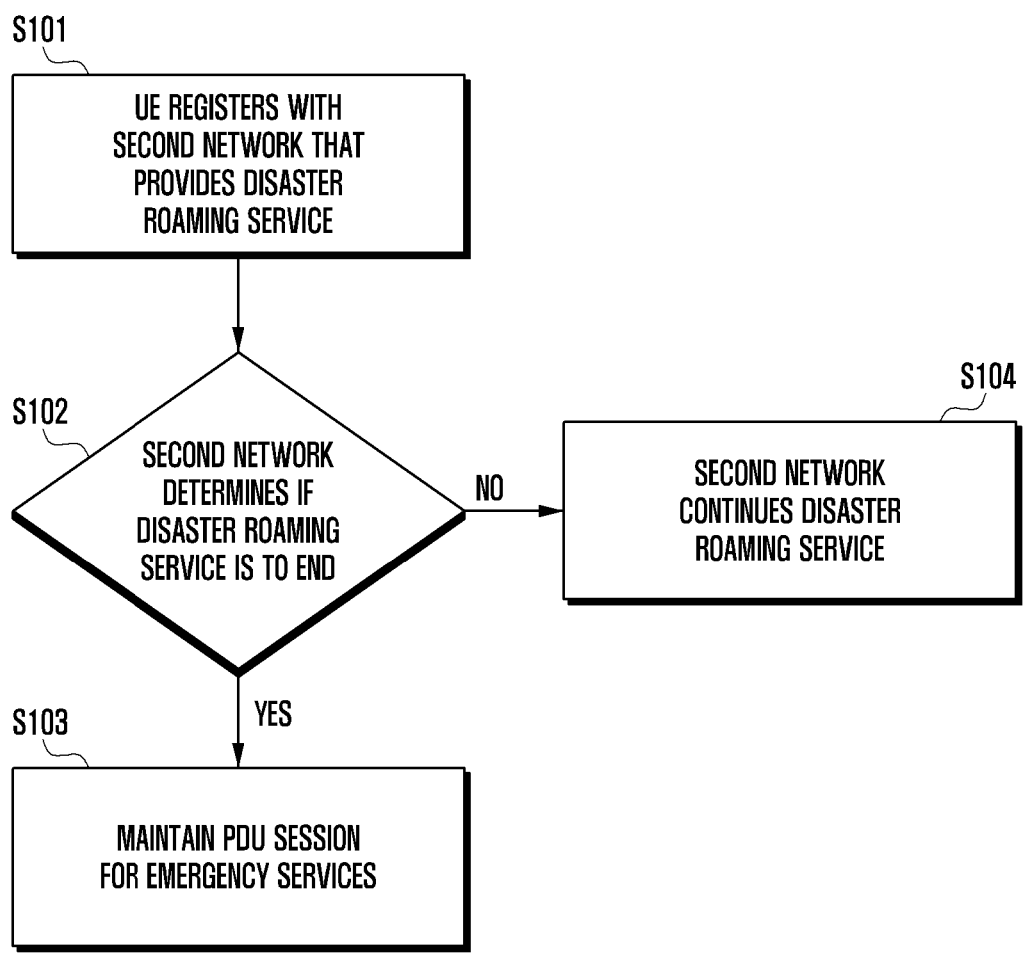
FIG. 1 illustrates a flowchart according to an embodiment of the disclosure.
Figure 2:
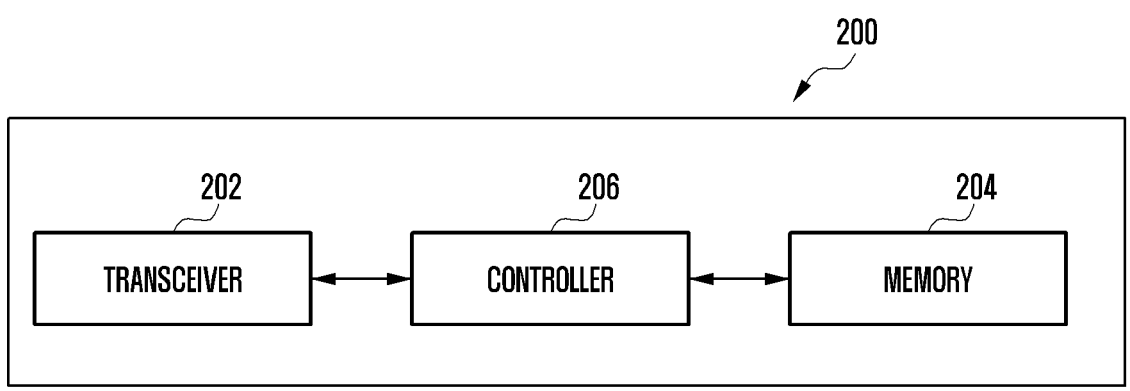
FIG. 2 illustrates a block diagram of a User Equipment (UE) according to an embodiment of the disclosure.
Figure 3:
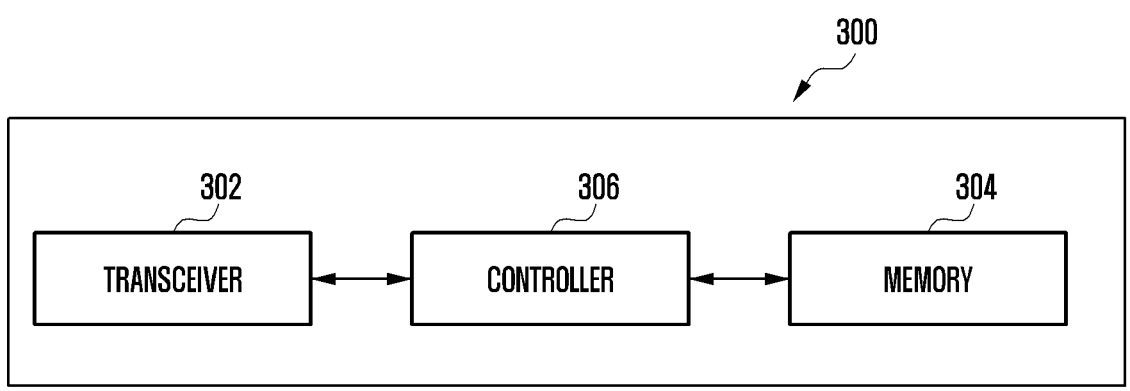
FIG. 3 illustrates a block diagram of an access and mobility management function (AMF) according to an embodiment of the disclosure.

FIGS. 1 to 3, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

The disclosure relates to improvements in providing disaster roaming service. Disaster roaming is a service whereby a user equipment (UE) registered with a first network is permitted to temporarily roam on a second network in the event that the first, home, network is afflicted by some form of outage, such as fire, earthquake or other disaster.

Third generation partnership project (3GPP) working groups have developed solutions to enable a UE to get service even when a disaster condition (e.g., fire, etc) occurs on a public land mobile network (PLMN). In this case, the UE is said to obtain disaster roaming service on a forbidden PLMN when no other PLMN is available.

The study on disaster roaming service can be found in 3GPP TR 24.811, whereas normative specification for the related work has been specified in 3GPP TS 23.122, 23.501, and 24.501.

After the disaster ends, the UE is expected to return to its previous PLMN as quickly as possible. As such, the PLMN that provides disaster roaming service will ensure the UE returns back to its original PLMN that has recovered from disaster.

However, the UE may have a protocol data unit (PDU) session for emergency when disaster roaming ends. This means that the UE may have registered for disaster roaming service and then established a PDU session for emergency services. While the PDU session is still active, the disaster condition may have ended. The end of the disaster roaming service would normally require that the UE uses its previous PLMN. However in this case, the UE will not be able to leave immediately due to the ongoing emergency service. Consequently, since the UE remains registered for disaster roaming service, it will continue to get all the services that it needs although the disaster roaming has ended. The primary cause for this issue is that the UE's registration is not changed, i.e., the UE remains registered for disaster roaming. In this case, a change is required to ensure that the UE will not get more services beyond the emergency service since if the emergency service is over, the UE will not remain registered for emergency service (due to the recovery from disaster condition of the previous PLMN).

Furthermore, the network unnecessarily provides EPS-related security algorithms to the UE. Disaster roaming service is only applicable to $5^{th}$ generation (5G) system (5GS) (i.e., N1 mode) and, as such, the UE is not expected to use EPS (i.e., S1 mode) when it is using disaster roaming service.

Currently a UE that supports S1 mode will indicate so in the 5GMM capability Information Element, IE, during the registration procedure. For a UE that supports S1 mode, the access and mobility management function (AMF) is currently required to provide the UE with the selected EPS NAS algorithms that should be saved and used by the UE in case the UE goes to EPS. In fact, in some cases, this is mandatory on the network side. The security mode control procedure is used for this purpose in which the network sends the Security Mode Command message and the UE then responds with the Security Mode Complete message. The current issue is that currently there is a case in which the security mode control procedure would be required to be executed again only for the purpose of sending this information to the UE, where this information will anyways not be used. The below text is taken from TS24.501 where this is described:

"Upon receipt of a REGISTRATION REQUEST message, if the AMF has the valid current 5G NAS security context indicated by the UE, the AMF supports N26 interface and the UE set the S1 mode bit to "S1 mode supported" in the 5GMM capability IE of the REGISTRATION REQUEST message, the AMF shall check whether the selected EPS NAS security algorithms was successfully provided to the UE. If not, the AMF shall initiate the NAS security mode control procedure by sending a SECURITY MODE COMMAND message with the Selected EPS NAS security algorithms IE to the UE."

As can be seen from the above, the network will send the selected EPS NAS security algorithms to the UE that supports S1 mode even if the UE is not supposed to use EPS during disaster roaming service. This will lead to unnecessary signaling in the network.

Note that there may be other indications that the AMF sends to the UE because of the UE's support of S1 mode. All these indications may be erroneously used by the UE to conclude that S1 mode is supported or can be used for disaster roaming, while the UE can only actually receive disaster roaming service in 5GS.

Accordingly, the disclosure provides embodiments to solve the above problems.

A first embodiment involves informing the UE that it is registered for emergency services only.

A UE may have a PDU session for emergency services while it is registered for disaster roaming, i.e., the UE first registers for disaster roaming and then establishes a PDU session for emergency services (or establishes an emergency PDU session). While the PDU session for emergency services is existent/active/still established, the disaster condition may have ended in the other PLMN, where the UE should be had it not been for the disaster condition. The current PLMN that provides disaster roaming service would normally inform the UE (possibly by deregistering the UE) that the disaster condition has ended so as to have the UE use the PLMN on which a disaster condition is no longer available. However, this may not be possible, especially to deregister the UE, since the UE has a PDU session for emergency service. As such, this situation becomes one in which the UE should not be in the current PLMN but it also cannot leave immediately due to the ongoing emergency service.

To solve the problem, the network (e.g., AMF) may take any combination of the following actions, where these actions may be taken if/for a UE is registered for disaster roaming service. The AMF may:

- consider the UE to be registered for emergency services.
- send (transmit) the Configuration Update Command message and include the 5GS registration result IE and set the value such that it indicates that the UE is registered for emergency services, i.e., the value should be set to "Registered for emergency services".
- inform each/any SMF to release any PDU session that is not related to the PDU session for emergency services.
- the network may also include a timer which signifies the time the UE should wait before returning to its previous PLMN for which a disaster condition is no longer available.

The AMF may take any of the actions above when the AMF determines that the disaster condition is over for a PLMN, or the disaster condition is over for a PLMN which the UE in question would have used or for which the UE had indicated to be coming from or to be associated with or that the UE would have selected had it not been for the disaster condition. Alternatively, the AMF may take the proposed action above when the network (e.g., AMF) determines that the disaster condition has ended for a UE in question or when the network determines that it can no longer serve the UE for disaster roaming and optionally the UE has a PDU session for emergency service.

When the UE that is registered for disaster roaming receives a Configuration Update Command message with the 5GS registration result IE indicating a value of "Registered for emergency services", then the UE should no longer consider itself to be registered for disaster roaming. Instead, the UE should consider that it is registered for emergency services and shall locally release all non-emergency PDU sessions, if any. The UE may enter substrate 5GMM-REGISTERED.LIMITED-SERVICE.

A second embodiment involves an enforced "no interworking with EPS" scenario.

As mentioned above, disaster roaming service does not apply to EPS and, as such, any S1 related information need not be provided to the UE, except for the purpose of emergency services.

As such, the AMF need not initiate the security mode control procedure for the purpose of providing the selected EPS NAS security algorithms (or the Selected EPS NAS security algorithms IE) when a UE is registered for disaster roaming, even if the UE supports S1 mode (or even if the UE had indicated/indicates that it supports S1 mode in the 5GMM capability IE).

As such, for a UE that supports S1 mode (i.e., the UE sets the S1 mode bit to "S1 mode supported" in the 5GMM capability IE of the REGISTRATION REQUEST message) the AMF should verify the type of registration of the UE in order to determine whether or not the AMF should provide the Selected EPS NAS security algorithms IE to the UE. The AMF behavior may be as follows (where the UE is a UE which had indicated that it supports S1 mode as described above):

- If the UE is not registered for disaster roaming service, then the AMF determines that the Selected EPS NAS security algorithms IE should be provided to the UE. Note that this determination may be done if all other conditions for providing the IE are met. As such, the above is an additional condition that optionally needs to be verified by the network (e.g., AMF).
- If the UE is registered for disaster roaming service, then the AMF determines that the Selected EPS NAS security algorithms IE should not be provided to the UE. Note that this determination may be done if all other conditions for providing the IE are met. As such, the above is an additional condition that optionally needs to be verified by the network (e.g., AMF).

As such, when deciding on whether or not the Selected EPS NAS security algorithms IE should be provided to the UE, the AMF should now consider the UE's registration type as described above.

For example, the following change may be performed to the specification TS 24.501 in accordance with this embodiment:

"Upon receipt of a REGISTRATION REQUEST message, if the AMF has the valid current 5G NAS security context indicated by the UE, the AMF supports N26 interface and the UE set the 51 mode bit to "51 mode supported" in the 5GMM capability IE of the REGISTRATION REQUEST message and the UE is not registered for disaster roaming service, the AMF shall check whether the selected EPS NAS security algorithms was successfully provided to the UE. If not, the AMF shall initiate the NAS security mode control procedure by sending a SECURITY MODE COMMAND message with the Selected EPS NAS security algorithms IE to the UE." Or "Upon receipt of a REGISTRATION REQUEST message, if the AMF has the valid current 5G NAS security context indicated by the UE, the AMF supports N26 interface and the UE set the 51 mode bit to "51 mode supported" in the 5GMM capability IE of the REGISTRATION REQUEST message and the AMF did not indicate that the UE is registered for disaster roaming service in the REGISTRATION ACCEPT message, the AMF shall check whether the selected EPS NAS security algorithms was successfully provided to the UE. If not, the AMF shall initiate the NAS security mode control procedure by sending a SECURITY MODE COMMAND message with the Selected EPS NAS security algorithms IE to the UE."

Alternatively, the AMF may provide the UE with the Selected EPS NAS security algorithms IE even if the UE is registered for disaster roaming service. This may be based on local AMF policy, i.e., the AMF may behave as described above (i.e., to determine if the IE is provided to the UE based on the registration type) or may determine to always provide the IE to the UE, where optionally the IE may be set to a specific value, based on local policies.

In one alternative, the AMF may provide the IE to the UE even if the UE is registered for disaster roaming service. However, the AMF may set the IE to EIA0 and EEA0 (i.e., the NULL algorithms for integrity and/or ciphering), because the UE is registered for disaster roaming.

In one alternative, for a UE which is registered for disaster roaming service, when the AMF receives a Registration Request message where the 5GMM capability IE indicates that the UE supports S1 mode, then the AMF shall send (e.g., at any time, either during or after the completion of the registration procedure) the Security Mode Command message and include the Selected EPS NAS algorithms IE and furthermore set the algorithms (e.g., for integrity protection and/or encryption) to EIA0 and EEA0 (i.e., the NULL algorithms for integrity and/or ciphering).

For example, the following changes (shown underlined) may be made to the network specification:

"When the AMF sends the SECURITY MODE COMMAND message including an ngKSI value in the ngKSI IE set to "000" and 5G-IA0 and 5G-EA0 as the selected NAS security algorithms, if:

a) the AMF supports N26 interface;
b) the UE set the S1 mode bit to "S1 mode supported" in the 5GMM capability IE of the REGISTRATION REQUEST message; and
c) the security mode control procedure is initiated during an initial registration procedure for emergency services, during a registration procedure for mobility and periodic registration update for a UE that has an emergency PDU session, during a registration procedure for mobility and periodic registration update for a UE which is registered for disaster roaming service and the UE indicates that S1 mode is supported in the 5GMM capability IE, or during a service request procedure for a UE that has an emergency PDU session,
the SECURITY MODE COMMAND message shall also include the Selected EPS NAS security algorithms IE. The selected EPS NAS security algorithms shall be set to EIA0 and EEA0."

As per the above, the AMF may send the selected EPS NAS algorithms to the UE which is registered for disaster roaming and which performs a registration procedure and indicates that S1 mode is supported. Note that this is because the UE which adopts this behavior is expected to establish a PDU session for emergency session and such a PDU session is indeed transferable to EPS. Alternatively, the AMF may send the Security Mode Command message and provide the selected EPS NAS algorithms to the UE after the UE indicates that S1 mode is supported (during a registration procedure) and after the UE successfully establishes a PDU session for emergency services. As such, the AMF may take the proposed action either after the UE indicates that S1 mode is supported, or after the UE indicates that S1 mode is supported and also after the UE establishes a PDU session for emergency services.

Note that the condition 'the UE is not registered for disaster roaming' can be equivalently considered to be e.g., 'the AMF did not indicate that the UE is registered for disaster roaming' or 'the UE did not indicate "disaster roaming registration" in the 5GS registration type IE', or any combination of the above. As such, other equivalent conditions can be verified and the proposed actions can thus be taken accordingly.

Similarly, the condition 'a UE that is registered for disaster roaming' can be equivalently considered to be e.g., 'the AMF did indicate that the UE is registered for disaster roaming' or 'the UE did indicate "disaster roaming registration" in the 5GS registration type IE', or any combination of the above. As such, other equivalent conditions can be verified and the proposed actions can thus be taken accordingly for such a condition.

In other examples, the AMF may determine to indicate that certain or all parameters or features that are related to EPS are not supported, where this may be done only for UEs that are registered for disaster roaming even though the network actually supports these parameters or features. For example, the AMF may (e.g., based on local policies) determine to indicate the following to a UE that is registered for disaster roaming service:

The AMF may indicate that the N26 interface is not supported even if the interface is actually supported.
The AMF may indicate that EPS is not supported, or any feature that is related to EPS is not supported, even if this is not the case.
The AMF may avoid redirecting the UE to evolved packed core (EPC) e.g., as part of any consumer internet of things (CIoT) optimization. As such, if the UE sends any indication about its support for any parameter or feature, e.g., related to CIoT (or any feature), where for example the UE may indicate a preferred CIoT feature or a supported CIoT feature in EPS, then the AMF may ignore these parameters even if the AMF is configured (or based on policy) to redirect the UE to EPC based on the values of these parameters or indications from the UE. As such, the network may ignore the values provided for the UE's S1 mode capability and/or the EPS CIoT network behavior supported by the UE.

Alternatively, when the UE is registering for disaster roaming, the UE may determine to not provide the UE's S1 mode capability and/or the EPS CIoT network behavior supported by the UE, where this determination is based on the UE registering for disaster roaming. As such, the UE may provide these indications to the network if the UE is not registered/registering for disaster roaming. As such, the determination of whether or not to provide this information (or IE) by the UE should now consider the type of registration that the UE is requesting or the type of registration that the UE is registered with the network as described above.

For example, when the UE is registering for disaster roaming service, the UE should set the EPS Preferred CIoT network behavior (EPS-PNB-CIoT) field (in the 5GS update type IE) to the value '0 0', i.e., to a value indicating "no additional information".

If the UE that is registered for disaster roaming service receives the Selected EPS NAS security algorithms IE in any NAS message, e.g., the Security Mode Command message, the UE should verify if it is registered for disaster roaming and take the following action accordingly:

If the UE is registered for disaster roaming service, then the UE ignores or discards the received Selected EPS NAS security algorithms IE and its contents.
If the UE is not registered for disaster roaming service, then the UE uses the contents of the IE, or stores the contents of the IE.

Note that for all the solutions set out herein, the UE registering for disaster roaming can mean that the UE indicates "disaster roaming mobility registration updating" or "disaster roaming initial registration" in the 5GS registration type IE.

Also, the network determining that the UE is registered for disaster roaming may mean that the network has accepted a registration request from the UE where the 5GS registration result type IE is set as above and the AMF did not further indicate that the UE is not registered for disaster roaming (or the AMF did not further indicate that the UE is registered for normal service, optionally where normal service is not disaster roaming service).

FIG. 1 illustrates a flowchart according to an embodiment of the disclosure.

Referring to FIG. 1, at operation S101, the UE, previously registered with a first network, which is subject to a disaster, is subsequently registered with a second network, which provides disaster roaming service and wherein the UE has a protocol data unit (PDU) session for emergency services active at a given time. At operation S102, the second network determines if the disaster roaming service is to end. If so, at operation S103 the PDU session for emergency services is maintained. If the disaster roaming service is not to end, then the disaster roaming service continues at operation S104.

Various embodiments of the disclosure therefore address and at least partly overcome the problems set out earlier in this application. In particular, the UE continues the emergency service but the UE does not receive all the disaster roaming services.

FIG. 2 illustrates a block diagram of a UE according to an embodiment of the disclosure.

Referring to FIG. 2, a UE 200 includes at least one of a transceiver 202, a memory 204, or a controller 206. The elements of the UE 200 are not limited to the above-described example, and the UE 200 may include more or fewer elements than the above-described elements.

The transceiver 202 is capable of transmitting/receiving signals to/from other entities.

The memory 204 is capable of storing control information or data transmitted/received via the transceiver 202.

The controller 206 is capable of controlling operations of the UE 200. The controller 206 is capable of controlling the UE 200 to perform operations related to the UE 200 as described in the embodiments.

FIG. 3 illustrates a block diagram of an AMF according to an embodiment of the disclosure.

Referring to FIG. 3, an AMF 300 includes at least one of a transceiver 302, a memory 304, or a controller 306. The elements of the AMF 300 are not limited to the above-described example, and the AMF 300 may include more or fewer elements than the above-described elements.

The transceiver 302 is capable of transmitting/receiving signals to/from other entities.

The memory 304 is capable of storing control information or data transmitted/received via the transceiver 302.

The controller 306 is capable of controlling operations of the AMF 300. The controller 306 is capable of controlling the AMF 300 to perform operations related to the AMF 300 as described in the embodiments.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an access and mobility management function (AMF) in a public land mobile network (PLMN) providing disaster roaming service, the method comprising:
    receiving, from a user equipment (UE), a first message requesting a registration for the disaster roaming service;
    determining whether a disaster condition has ended in a previous PLMN associated with the UE which is registered for the disaster roaming service;
    in case that the disaster condition has ended and the UE has an emergency protocol data unit (PDU) session, generating a second message indicating that the UE is registered for emergency service; and
    transmitting, to the UE, the second message.

2. The method of claim 1,
    wherein the second message is a configuration update command message, and
    wherein the second message comprises $5^{th}$ generation (5G) system (5GS) registration result information indicating that the UE is registered for the emergency service.

3. The method of claim 2, wherein the generating of the second message comprises:
    setting the 5GS registration result information to a value indicating that the UE is registered for the emergency service.

4. A method performed by a user equipment (UE), the method comprising:
    transmitting, to an access and mobility management function (AMF), a first message requesting a registration to receive disaster roaming service; and
    in case that a disaster condition has ended and the UE has an emergency protocol data unit (PDU) session, receiving, from the AMF in a public land mobile network (PLMN) providing the disaster roaming service, a second message indicating that the UE is registered for emergency service.

5. The method of claim 4,
wherein the second message is a configuration update command message, and
wherein the second message comprises 5$^{th}$ generation (5G) system (5GS) registration result information indicating that the UE is registered for the emergency service.

6. The method of claim 5, wherein the 5GS registration result information is set to a value indicating that the UE is registered for the emergency service.

7. An access and mobility management function (AMF) in a public land mobile network (PLMN) providing disaster roaming service, the AMF comprising:
a transceiver; and
a processor coupled with the transceiver and configured to:
  receive, from a user equipment (UE), a first message requesting a registration for the disaster roaming service,
  determine whether a disaster condition has ended in a previous PLMN associated with the UE which is registered for the disaster roaming service,
  in case that the disaster condition has ended and the UE has an emergency protocol data unit (PDU) session, generate a second message indicating that the UE is registered for emergency service, and
  transmit, to the UE, the second message.

8. The AMF of claim 7,
wherein the second message is a configuration update command message, and
wherein the second message comprises 5$^{th}$ generation (5G) system (5GS) registration result information indicating that the UE is registered for the emergency service.

9. The AMF of claim 8, wherein the processor is configured to:
  set the 5GS registration result information to a value indicating that the UE is registered for the emergency service.

10. A user equipment (UE), the UE comprising:
a transceiver; and
a processor coupled with the transceiver and configured to:
  transmit, to an access and mobility management function (AMF), a first message requesting a registration to receive disaster roaming service, and
  in case that a disaster condition has ended and the UE has an emergency protocol data unit (PDU) session, receive, from the AMF in a public land mobile network (PLMN) providing the disaster roaming service, a second message indicating that the UE is registered for emergency service.

11. The UE of claim 10,
wherein the second message is a configuration update command message, and
wherein the second message comprises 5$^{th}$ generation (5G) system (5GS) registration result information indicating that the UE is registered for the emergency service.

12. The UE of claim 11, wherein the 5GS registration result information is set to a value indicating that the UE is registered for the emergency service.

* * * * *